(12) United States Patent
Bodley et al.

(10) Patent No.: US 6,801,196 B1
(45) Date of Patent: Oct. 5, 2004

(54) METHOD AND APPARATUS TO CONTROL POWER STATE OF A DISPLAY DEVICE

(75) Inventors: Andrew D. Bodley, Portland, OR (US); Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/442,872

(22) Filed: Nov. 18, 1999

(51) Int. Cl.[7] .............................................. G09G 5/10
(52) U.S. Cl. ...................... 345/211; 345/204; 713/300
(58) Field of Search ......................... 345/211–215, 102; 713/300, 310, 320, 323, 324

(56) References Cited

U.S. PATENT DOCUMENTS

| 5,389,952 A | | 2/1995 | Kikinis | |
| 5,532,719 A | * | 7/1996 | Kikinis | 345/211 |
| 5,548,764 A | * | 8/1996 | Duley et al. | 713/310 |
| 5,630,144 A | * | 5/1997 | Woog et al. | 713/310 |
| 5,648,799 A | | 7/1997 | Kikinis | |
| 5,774,116 A | | 6/1998 | Potsch | |
| 5,786,813 A | * | 7/1998 | Kurikko | 345/212 |
| 5,880,719 A | * | 3/1999 | Kikinis | 345/212 |
| 6,006,335 A | * | 12/1999 | Choi et al. | 713/310 |

FOREIGN PATENT DOCUMENTS

| JP | 06230860 A | * | 8/1994 | G06F/1/26 |
| JP | 09-090317 | * | 4/1997 | G09G/3/36 |

* cited by examiner

*Primary Examiner*—Alexander Eisen
(74) *Attorney, Agent, or Firm*—Blakely, Sokoloff, Taylor & Zafman LLP

(57) ABSTRACT

A method includes applying a power control signal from a computer system to a display device, and maintaining the display device in a first reduced power consumption state while the power control signal is applied.

12 Claims, 2 Drawing Sheets

METHOD AND APPARATUS TO CONTROL POWER STATE OF A DISPLAY DEVICE

BACKGROUND

1. Field

The invention relates to control of power consumption in electronic circuits, and, more particularly, to control of power consumption in a display device.

2. Background Information

Computer systems typically employ a display device for displaying visual information, such as text characters, images, icons, and graphics. A computer system may be any device comprising a processor to execute instructions and a memory to store the instructions. The display device is typically coupled to the computer system by way of a cable which provides signal paths for data and control signals between the computer system and the display device. The computer system may execute a program which results in data signals being transmitted to the display device over the cable. The data signals may represent text characters, images, etc. for conveying visual information to a user of the computer system. As used herein, the term "program" may refer to any form of packaging (that is, organization and/or grouping) of software instructions. The term program may refer to executable programs, statically or dynamically linked libraries, applets, and many other forms of instructions packaging and organization well known in the art.

During periods of inactivity on the computer system, when no new signals are being generated for display, it may be desirable to reduce the power consumed by the display device. During periods of inactivity, the display device may place some or all of its circuits into a state in which these circuits consume less power than they do during operation at other times. However, even in reduced power states the display device circuits may consume substantial power. Although the display device may detect a period of inactivity, when no new data signals are being made available over the cable from the computer system, there is currently no convenient mechanism for the display to detect other conditions under which placing its circuits into a reduced power state would be appropriate. For example, the display device may not be capable of detecting when the user of the computer system presses a particular sequence of keys on a keyboard input device, the key sequence indicating that the user will no longer be interacting with the computer system in the immediate future. In this situation, the display device could be placed into a power state during which it consumes virtually no power without inconveniencing the user. However, the display device has no way of detecting the key sequence. Thus, there exists a continuing need for a mechanism by which a computer system may place a display device into a reduced power state in response to events which take place upon a computer system.

SUMMARY

A method includes applying a power control signal from a computer system to a display device, and maintaining the display device in a first reduced power consumption state while the power control signal is applied.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

In accordance with an embodiment of the present invention, a computer system may control a power signal to place a device into a reduced power state. In this state, power may be removed from components of the display device, resulting in low (or no) power consumption. Substantial power savings may thus be realized.

Figure 1:
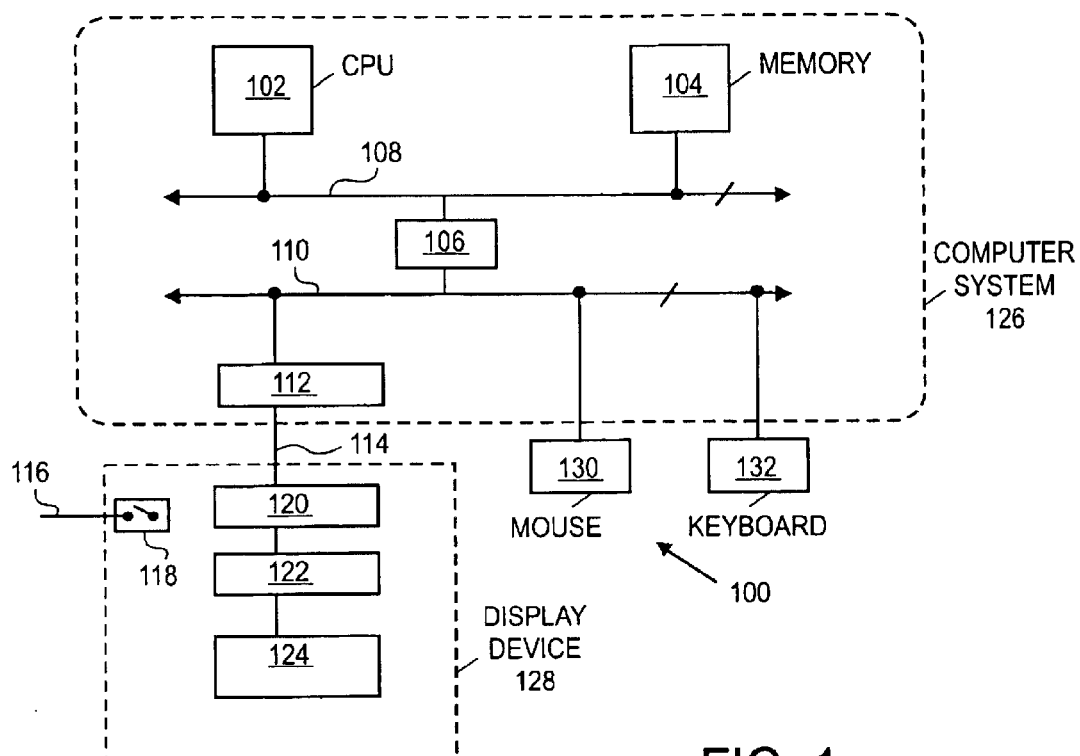
FIG. 1 is a block diagram illustrating an embodiment of a system in accordance with the present invention.

FIG. 1 is a block diagram illustrating an embodiment 100 of a system in accordance with the present invention. Embodiment 100 comprises a computer system 126, comprising a processor 102 to execute instructions supplied from a bus 108. The execution instructions may be stored in a memory 104 from which they are supplied to the processor 102 by the bus 108 for execution. The processor 102 may be implemented using any semiconductor fabrication technology and may execute any instruction set including, but not limited to, instruction sets supported by an Intel Corporation Pentium® processor or compatible processor. Multiple processors may also be present in the system 100. The bus 108 may be implemented using technologies for propagating signals including, but not limited to, electronic and optical conductors and may in fact comprise multiple busses. The memory 104 may include random access memory (RAM), read-only memory (ROM), or any other form of memory capable of storing instructions which may then be supplied to the processor 102 by the bus 108 for execution. Of course, computer system embodiment 126 may comprise other components which are not shown so as not to obscure the present invention.

To perform signal input/output, computer system 126 may comprise an I/O bus 110 bridged to processor bus 108 by way of a bus bridge circuit 106. A keyboard 132 and a mouse 130 may each be coupled to the I/O bus 110. Of course, other peripheral devices may be present as well.

A display controller 112 may be coupled to the I/O bus and to a display device 128. Display controller 112 may supply data and control signals to display device 128 by way of display cable 114. Display device 128 may receive operating power by way of power cable 116. Power to display device 128 may be switched on and off by way of mechanical switch 118. Of course, the invention is not limited in scope to this particular embodiment.

Display device 128 may comprise a power control circuit 120, a control circuit 122, and a display driver circuit 124. Of course, other components not relevant to an understanding of the present invention may be present as well. Power control circuit 120 provides control of display device 128 power states, in a manner described more fully below.

Control circuit 122 interprets signals from display cable 114 and provides control and data signals to display driver circuit 124. Control circuit 120 may also comprise a memory to store configuration settings about display device 128. Examples of control signals are horizontal and vertical refresh, and "link active" and "link clock", the purpose of each of which is generally known in the art. Examples of configuration settings are the current and supported horizontal and vertical display resolution of the display device 128, in pixels. Display driver circuit 124 converts data signals into lighted areas on a display screen (not shown). These lighted areas may be referred to as "pixels". Of course, this is only one embodiment and display device 128 may include many additional circuits not shown, or may be configured differently than in the manner described herein.

Figure 2:
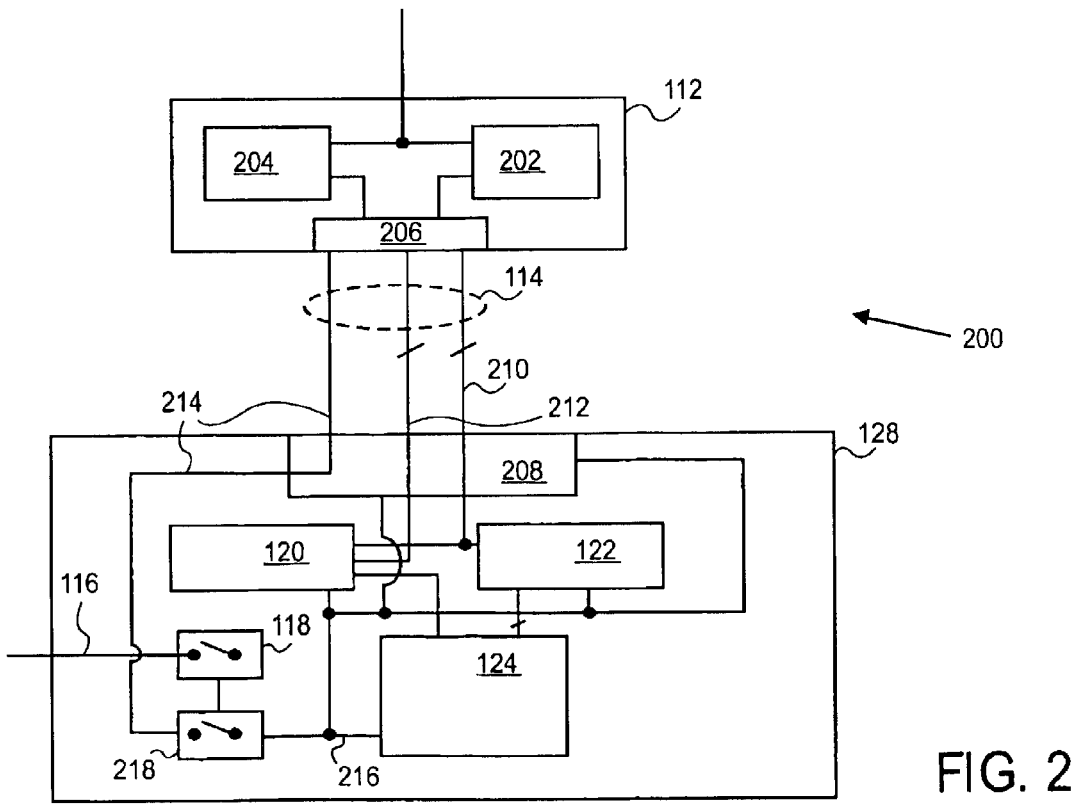
FIG. 2 is a block diagram illustrating an embodiment of a system in accordance with the present invention.

FIG. 2 is a block diagram illustrating an embodiment 200 of a system in accordance with the present invention. Display controller 112 comprises memory 204 (also known as a "frame buffer"), control circuit 202, and an interface circuit 206. Memory 204 stores the data values which may eventually be supplied to display device 128 to be translated into pixels. Control circuit 202 provides control signals to display device 128 by way of cable 114. Interface circuit 206 provides a physical interface between cable 114 and other components of controller 112. Likewise, display device 128 comprises a physical interface circuit 208 to perform a similar function within display device 128.

Cable 114 comprises three signal paths. Signal path 212 carries data signals to display device 128. Signal path 210 carries control signals to (and possibly from) display device 128. Signal path 214 operates in accordance with the present invention to toggle power to circuits comprised by display device 128, said circuits including power control 120, controller 122, and display driver 124. Controller 122 may transform data and control signals received over cable 114 into signals to display driver 124, which converts these signals into points of light on a display surface. Signal path 214 provides a path by which a power control signal may be applied to electronic switch 218 to disconnect power to internal power signal path 216.

Figure 3:
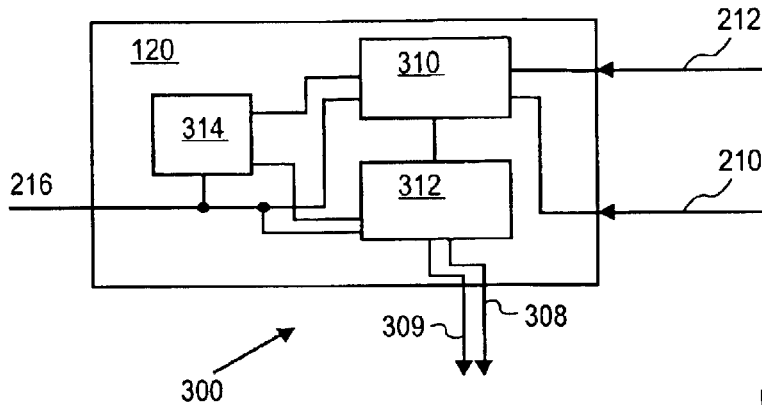
FIG. 3 is a block diagram illustrating an embodiment of a power control circuit in accordance with the present invention.

FIG. 3 is a block diagram illustrating an embodiment 300 of a power control circuit 120 in accordance with the present invention. Power control circuit 120 comprises an activity monitor 310, a timer 314, and control logic circuit 312. Activity monitor 310 examines the rate of signaling on data signal path 212, or the signaling rate of certain control signal path (such as the rate of a clock or sync signal).

When the signal activity rate on the signal paths of the display cable 114 fall below a predefined threshold level, activity monitor 310 may provide an indication signal to control logic circuit 312. This signal may indicate that the display device is not currently in active use by the computer system 126. In response, control logic circuit 312 may produce a signal 308 to other components of display device 128 to reduce the power consumed by these other components. For example, signal 308 may be provided to display driver circuit 124. Timer circuit 314 tracks the duration of this low-activity state on cable 114. If the low-activity state persists for a predetermined period of time (which may be programmable), control logic circuit may produce a signal 309 to lower the power consumption of device components still further. For example, signal 308 might result in removal of power from electron guns (analog displays) or pixels (digital displays) controlled by display driver 124. Signal 309 might result in power consumption being reduced in other components of display device 128, such as control circuit 122.

In one embodiment, a power control signal is provided on signal path 214. Power control signal may comprise a logical high voltage level, for example five volts. When the signal is at a logical high (henceforth, "ON"), switch 218 is closed ("ON") and, if mechanical switch 218 is also "ON", power is available to components of display device 128. Changing the power control signal to a logical low voltage level, for example zero volts (henceforth, "OFF"), may result in switch 218 becoming open, removing power from components of display device 128. Of course, the present invention is in no way restricted to particular voltage levels of ON and OFF.

Figure 4:
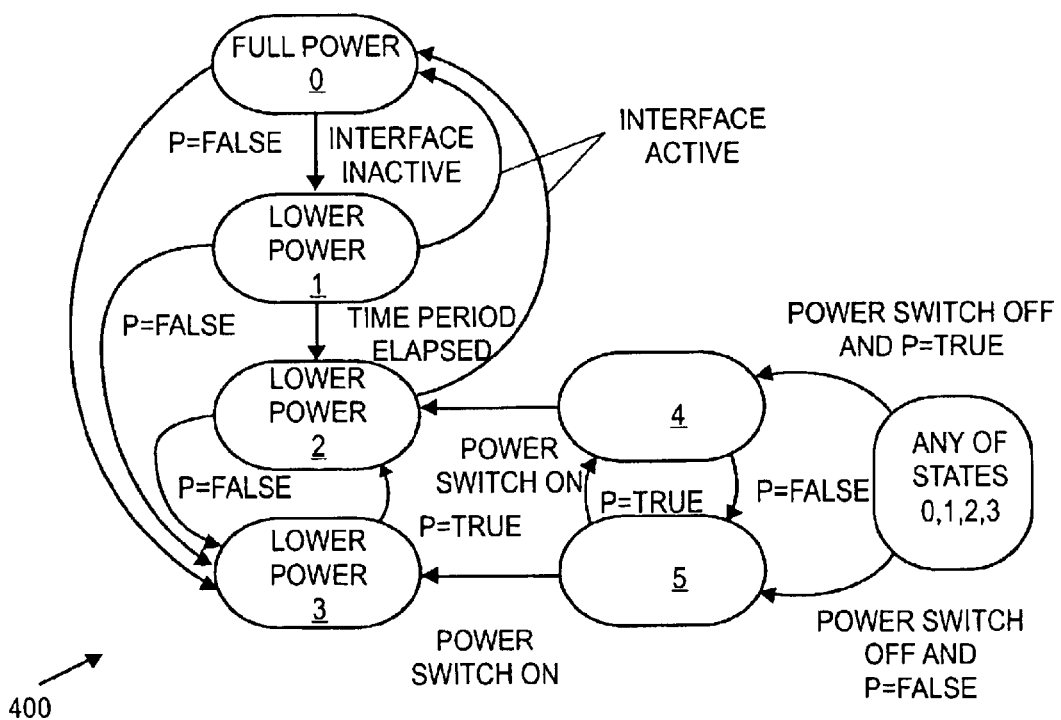
FIG. 4 is diagram illustrating an embodiment of a state transitions in accordance with the present invention.

FIG. 4 is diagram illustrating an embodiment 400 of power state transitions of a display device in accordance with the present invention. At state 0 the display device is fully powered, that is, in a state where more power is consumed than in the other states. Power control signal on path 214 is, in FIG. 4, referred to by the symbol P. Signal activity on the display cable 114 below a predetermined (possibly programmable) threshold level may result in a state change to first low power state 1. In this state, components of display device 128 operate with less overall power consumption than in state 0. In the inactive state of signals on display cable 114 persist for a predetermined (possibly programmable) period of time, a transition is made to low power state 2, in which components of the display device 128 consume less overall power than in state 1. If, during either of low power states 1 or 2, the activity of the signals on the display cable 114 rises above the predetermined threshold level, a transition is made back to state 0. However, if power control signal P is turned "OFF" (FALSE) during any one of states 0–2, a transition is made to lower power state 3 in which overall power consumption of display device is lower than in state 2. Turning P "OFF" may be referred to as "applying" P to the display device. In one embodiment, power may be removed from all components of display device when P is applied. Display device 128 remains in state 3 until P is turned "ON" again (no longer applied), at which time a transition is made to state 2.

Manual power switch 118 may be turned "OFF" during any of states 0–3. When this happens, there are two possible outcomes. If P is "ON" (TRUE) a transition is made to state 4; if P is "OFF" a transition is made to state 5. Toggling P in either of these two states results in a transition to the other of the two states. Turning the manual switch 118 "ON" at state 4 transitions to state 2; turning switch 118 "ON" at state 5 transitions to state 3.

Thus, turning P "OFF" results in a transition from any of states 0–2 to state 3, which may result in very low (or no) power consumption by display device 128. Substantial power savings may be realized in this fashion. Signal P may be provided from computer system 126 to display device 128 and may be under the control of a program executing on computer system 126. Thus, computer system 126 may control the time at which display device 128 is placed into a very low power consumption state by executing one or more instructions on a computer system processor 102 (for example, by executing instructions to apply the signal P when the user of the computer system 126 presses a certain key sequence on keyboard 132).

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

transitioning a display device from a first power state to a second power state in response to signal activity to the display device falling below a predetermined activity threshold, the second power state to consume less power than the first power state;

when in the second power state, transitioning the display device to a third power state in response to the signal activity to the display device remaining below the predetermined threshold for a predetermined period of time, the third power state is to consume less power than the second power state;

when in the second or third power state, transitioning the display device to the first power state in response to signal activity to the display device rising above the predetermined threshold; and when in the first, second, or third power state, transitioning the display device to a fourth power state in response to a a power control signal from a computer system separate from the monitor, the power control signal does not transition a power state of the computer system, the fourth power state is to consume less power than the third reduced power state.

2. The method of claim 1, wherein the predetermined activity threshold is programmable.

3. The method of claim 1, wherein the predetermined period of time is programmable.

4. The method of claim 1 wherein the power control signal is transitioned in response to a predetermined sequence being entered on a keyboard.

5. A computer-readable medium, having stored thereon a set of instruction, the instruction when executed, perform a method comprising:

transitioning a display device from a first power state to a second power state in response to signal activity to the display device falling below a predetermined activity threshold, the second power state to consume less power than the first power state;

when in the second power state, transitioning the display device to a third power state in response to the signal activity to the display device remaining below the predetermined threshold for a predetermined period of time, the third power state is to consume less power than the second power state;

when in the second or third power state, transitioning the display device to the first power state in response to signal activity to the display device rising above the predetermined threshold; and when in the first, second, or third power state, transitioning the display device to a fourth power state in response to a power control signal from a computer system separate from the monitor, the power control signal does not transition a power state of the computer system, the fourth power state is to consume less power than the third reduced power state.

6. The computer-readable medium of claim 5, wherein the predetermined activity threshold is programmable.

7. The computer-readable medium of claim 5, wherein the predetermined period of time is programmable.

8. The computer-readable medium of claim 5, wherein the power control signal is transitioned in response to a predetermined sequence being entered on a keyboard.

9. An apparatus comprising:

a unit to transition a display device from a first power state to a second power state in response to signal activity to the display device falling below a predetermined activity threshold, the second power state to consume less power than the first power state;

when in the second power state, a unit to transition the display device to a third power state in response to the signal activity to the display device remaining below the predetermined threshold for a predetermined period of time, the third power state is to consume less power than the second power state;

when in the second or third power state, a unit to transition the display device to the first power state in response to signal activity to the display device rising above the predetermined threshold; and when in the first, second, or third power state, a unit to transition the display device to a fourth power state in response to a power control signal from a computer system separate from the monitor, the power control signal does not transition a power state of the computer system, the fourth power state is to consume less power than the third reduced power state.

10. The apparatus of claim 9, wherein the predetermined activity threshold is programmable.

11. The apparatus of claim 9, wherein the predetermined period of time is programmable.

12. The apparatus of claim 9, wherein the power control signal is transitioned in response to a predetermined sequence being entered on a keyboard.

* * * * *